July 5, 1938.  C. W. WOODS  2,122,922

LIQUID TESTING APPARATUS

Filed June 26, 1936  2 Sheets-Sheet 1

Inventor
C. W. Woods.
Arthur H. Sturges  Attorney

Inventor
C. W. Woods.
Arthur H. Sturges Attorney

Patented July 5, 1938

2,122,922

UNITED STATES PATENT OFFICE 2,122,922

LIQUID TESTING APPARATUS

Clayton W. Woods, Omaha, Nebr.

Application June 26, 1936, Serial No. 87,444

5 Claims. (Cl. 23—253)

This invention relates to the water softening art and more particularly to an apparatus for ascertaining the characteristics of quantities of water with respect to the degree of hardness or softness thereof after the same has passed through a water softening means such as or similar to that means illustrated and described in Patent No. 1,195,923 issued August 12, 1916.

It is an object of the invention to provide co-operative means for designating either visibly or audibly, or both, to an operator the result of a water test.

It is another object of the invention to provide means for testing said water for determining said characteristics in deciding whether or not the water softener has completed its water softening function to a sufficient extent and should be shut off for reconditioning or regeneration.

A further object of the invention is to provide means for testing the regeneration brine and flush water to determine when the water softener is again ready for efficient service.

A still further object of the invention is to provide means for applying a soap test to water, said means to be of manual or automatic control as may be selected by the operator.

With the foregoing and other objects in view the invention will be more particularly described hereinafter and more fully pointed out in the claims appended hereto.

In the drawings wherein like symbols refer to like or corresponding parts throughout the several views.

Figure 1:
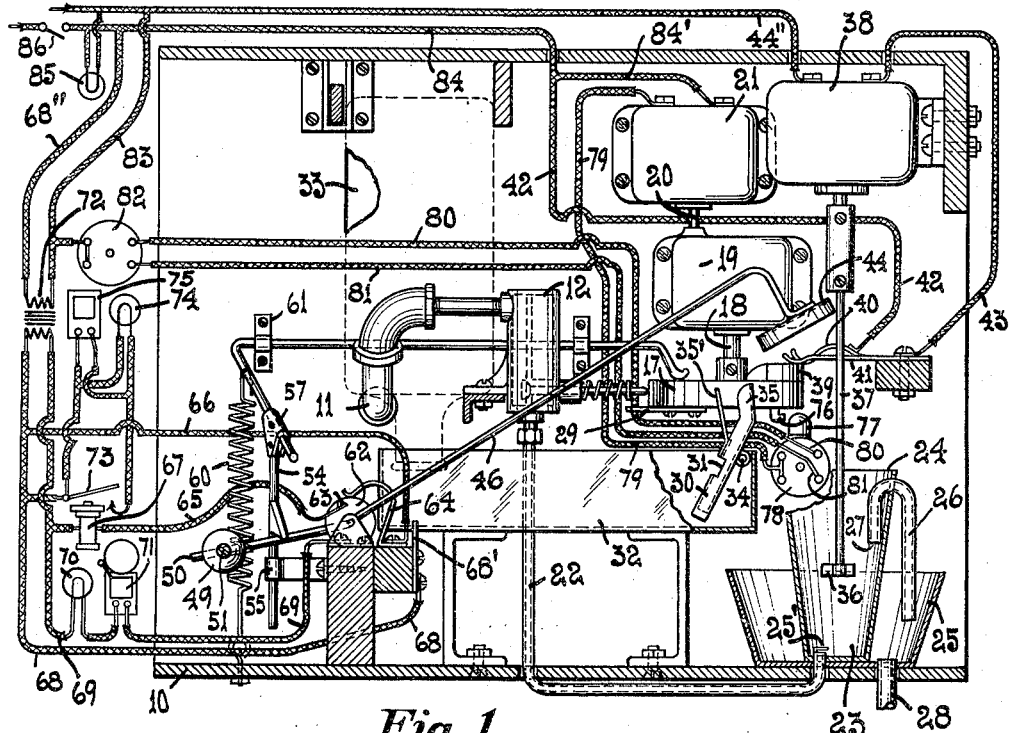
Figure 1 is a longitudinal vertical section of a water tester containing an embodiment of the present invention, the view being taken substantially along the dotted line 1—1 of Figure 2.
Figure 2:
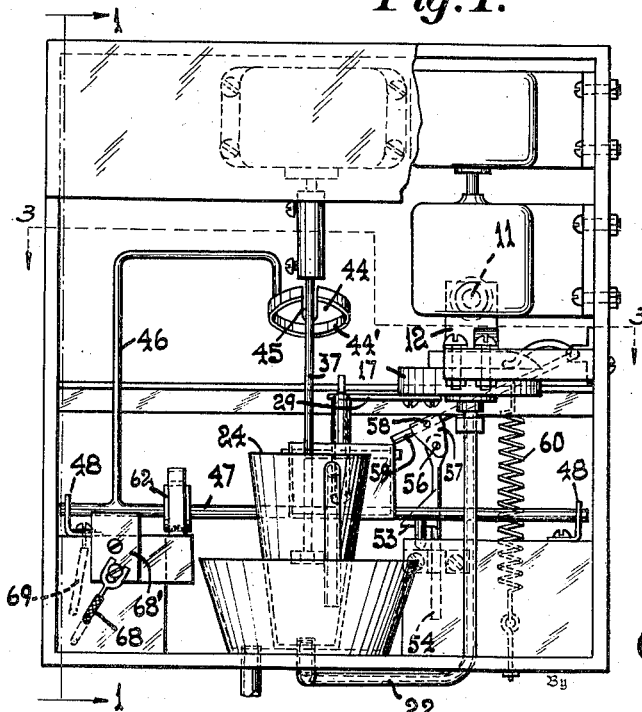
Figure 2 is an end elevation of the said embodiment.

In the practice of the art soap is usually employed for testing water and in order that a test shall indicate, with an adequate degree of certainty, the condition of the water as to the softness thereof, it is essential that soap be placed in contact with the water for a suitable period of time sufficient to permit soap bubbles to form and it is essential that a proportional amount of soap be placed in contact with a preselected quantity of water to consummate an accurate test.

The present invention in its broadest aspect includes, preferably, the sequential order mentioned in the succeeding four paragraphs for consummating the steps of a test.

First from a batch of water for which a test is desired a sample is admitted to a vessel or container and a predetermined or measured quantity of said sample is caused to remain in the vessel or mixing chamber for testing purposes.

Next a measured or preselected quantity of liquid soap is then caused to enter the vessel for admixture with said measured quantity or sample of test water.

Next said quantities of soap and water are caused to become admixed or contact by any suitable means, preferably by agitation, stirring or the like.

Immediately after an adequate amount of stirring of the soap and water mixture has taken place a means is caused to contact with the mixture of soap and water for actuating enunciators whereby the operator may know the physical characteristics of the water tested.

The steps mentioned in the foregoing four paragraphs are described herein in the sequential order above stated and the specific embodiment of the invention illustrated in the accompanying drawings and which may be varied from as to form and arrangements of parts, includes a frame or housing 10 formed of any suitable material, said frame being adapted to support in co-operating relation the mechanism of the apparatus and also providing means for transporting the several parts of the apparatus in assembled relation, although it will be understood that the several parts of the apparatus may be remotely positioned with respect to each other and permanently installed and that the mobility of the apparatus as a whole unit is not essential.

The means for admitting a sample of water to the apparatus preferably includes a conduit 11, one end of which is in communication with the said water softening apparatus which may be such as shown in Patent Number 1,195,923. The conduit 11 may include suitable elbows or pipe joints, or may consist of a flexible hose or trough, said conduit being in communication with a valve housing 12.

The valve housing is provided with a valve head 13 having a valve stem 14 extending outwardly of the housing. A spring 15 is mounted on the valve stem for normally urging the valve head against its seat for preventing a flow of water through the valve housing from the said water softening apparatus at times when the valve is closed. The urge of the spring 15 is overcome at times and the valve opened by means of an elongated lug 16 positioned on the perimeter of a revoluble disc 17, the latter being affixed to a shaft 18, the disc revolving in the counter-clock-wise direction indicated by the arrow A in Figure 3.

The shaft 18 extends into a gear housing 19 within which suitable gears, not shown, are provided, said gears being adapted to be driven by the shaft 20 of a motor 21, said gearing being such that the disc revolves slowly, the desired speed of the disc being approximately one revolution for each two and one-half minute period of time in instances where the diameter of the disc is substantially two and one-half inches.

The valve is held open during a revoluble movement of the disc 17 until such time as the lug 16 moves away from contact with the end of the stem 14, said lug being elongated sufficiently to permit an adequate quantity of water to pass through the valve and through the pipe 22, the latter leading to the bottom of a vessel, container or mixing chamber 23. The quantity of the water thus admitted to the mixing chamber is sufficient to wash out the vessel 23 and remove the residue of any prior test water therefrom and insure that the water trapped in the vessel, as later described, for a new test is a true unadulterated sample. While the valve remains open the water flowing into the mixing chamber from the pipe 22 overflows the upper edge 24 of the mixing chamber, said pipe being provided with a baffle plate 25' for preventing the water from spurting out of the vessel and after the valve is closed the vessel 23 being washed and a true sample of the water remaining in the vessel, the sample is then reduced to a preselected quantity by means of a goose neck syphon tube 26 which causes the level of the water within the mixing chamber to be lowered to the upper end 27 of the goose neck, said end being positioned within the vessel. The water which has overflown the upper edge 24 of the vessel together with the water syphoned out of the vessel through the goose neck conduit 26 flows outwardly through the drain pipe 28 connected to the cup or container 25 whereby a measured quantity of test water remains in the mixing chamber 23.

The next step or cycle of operation preferably is to cause a preselected quantity of test substance or similar element, preferably liquid soap, to enter the vessel 23 for an admixture or contact with the proportional amount of test water within the chamber. When soap is used for said purpose the proportional quantity thereof is the amount usually employed in the conventional practice.

The disc 17 is provided with an outwardly extended finger 29 which is so positioned on the disc with respect to the lug 16 that when the lug has passed the valve stem 14 and the valve within the valve housing 12 is seated that the outer end of the finger 29 then actuates a pivotally mounted cup 30 for conveying soap or the like.

As best shown in Figure 1, the soap cup 30 is tubular having a closed end and an opening 31 for the admission of soap from a reservoir 32 at times when the soap cup is in a lowered position within the reservoir. The level of the liquid soap within the reservoir 32 is maintained constant by means of a supply of liquid soap which is derived from a suitable source such as from a bottle 33 having its outlet port disposed below the upper edges of the side walls of the reservoir 32.

The bottle 33 is removably secured in an upright position as illustrated in Figure 1 and may be maintained in said position by any suitable means such as resilient clamps, not shown. At intermittent periods, as may be required, the operator may manually remove and refill the bottle 33 with soap and reposition it within the apparatus, whereby as soap is dipped from the reservoir 32 by the measuring cup 30 the quantity of soap removed from the reservoir is automatically replenished from the bottle 33 or from said source.

The soap cup is pivotally mounted on an axle 34 carried by the opposite side walls of the reservoir and is adapted to have vertical swinging movements as actuated in one direction by the finger 29 coming in contact with the arm 35' of the soap cup for swinging the latter upwardly and outwardly of the reservoir, said cup returning to a normal position by gravity after the finger 29 has passed out of contact with the arm 35'.

The opening 31 of the soap cup is of a preselected size and so arranged that during an upward movement of the cup a measured quantity of soap is carried outwardly of the reservoir or from said source of supply, any amount of soap in excess of the desired quantity flowing outwardly of the opening 31 back to the reservoir. When the lower end 30 of the soap cup is elevated above its axle 34, said measured quantity of soap flows from the cup outwardly thereof and through the then lowered trough 35 of the soap cup and is delivered into the mixing container or vessel 23 for application to the measured proportional test water then within the chamber 23; whereupon said water and soap are adequately admixed by stirring and in instances where it is unnecessary to flush out the mixing vessel 23 the soap may be placed in the vessel prior to the entrance of the water therein.

The stirring means preferably includes a revoluble shaft having a paddle or agitator 36 preferably secured to a shaft 37, the latter being preferably driven by a second motor 38 at times when the motor is electrically energized. A spring motor may be employed in lieu of an electric motor.

Synchronized means are provided for actuating the motor 38 so that, preferably, the agitator 36 has no motion until after the measured test water and soap are positioned within the vessel 23.

The heretofore mentioned disc 17 is formed of insulating material having adjacent its perimeter and on its upper face a vertically disposed lug-electrode 39, the latter having ends tapered downwardly toward the surface of the disc for the mechanical purpose of facilitating the spring electrodes 40 and 41 to slide into and out of contact with and upon the lug electrode 39, the latter being sufficient in heighth to urge the electrodes 40 and 41 upwardly for causing a suitable electrical contact between the members 39, 40 and 41 for closing a circuit therebetween. The spring electrodes 40 and 41 are in communication with conductors or wires 42 and 43 which respectively are in communication with a source of electrical energy and the motor 38, the latter having a wire 44" also in communication with said source, whereby the paddle or agitator 36 is actuated for admixing the testing soap and test water then within the chamber 23.

Figure 3:
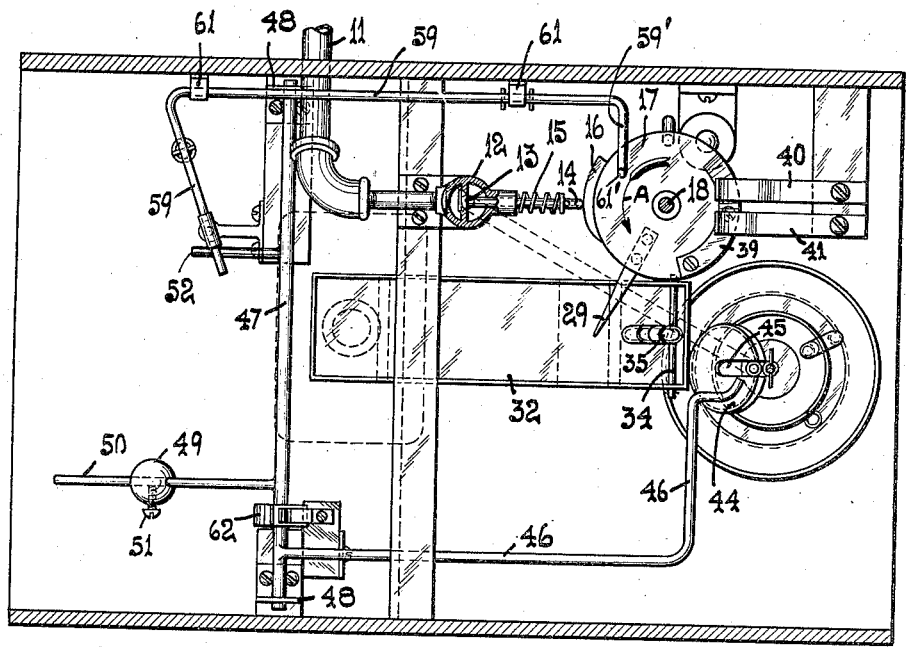
Figure 3 is a top plan view thereof, the cover of a housing or frame employed being removed, the view being taken substantially on the dotted line 3—3 of Figure 2.

As best shown in Figure 3, the lug-electrode 39 is sufficiently elongated in plan, which in conjunction with the disc 17 revolving slowly, insures that the said stirring is continued for a suitable length of time for causing a thorough admixture of the test soap and water for purposes later mentioned.

As best shown in Figure 3, the lug-electrode 39 is disposed upon the opposite side of the disc 17 with respect to the lug 16, whereby an electrical circuit through the motor 38 is not closed until after such time as the measured test water is positioned within the mixing chamber 23 and the test soap has been also distributed thereto.

Resultant from the stirring of the testing soap and test water suds are generated within the mixing chamber 23 assuming that the test water has been rendered of sufficient softness by an apparatus such as that described in Patent Number 1,195,923, said suds swelling or increasing in bulk. In instances when the test water is not of sufficient softness in proportion to the quantity of test soap stirred into said test water, said suds are not generated and these facts are utilized for indicating the characteristics of the batch of water from which said test water sample has been taken.

The means for actuating the mechanism which indicates said characteristics includes a float 44 which is circular in plan and of a diameter slightly less than the diameter of the mixing chamber 23 adjacent the end 27 of the goose neck 26. The float is provided with a downturned annular flange 44', and is slotted as at 45 for permitting the float to be lowered into the mixing chamber about the goose neck and stirring shaft 37. Assuming that soap bubbles have been generated within the vessel 23, the bulk thereof permits the float to move downwardly only to the top of and into contact with said suds, the latter blocking a further downward movement of the float and causing certain indicators or enunciators or signals to be actuated as later described. In instances when no soap bubbles have formed within the vessel 23, the test water being hard in character and the soap suds absent, the contents of the vessel is of less bulk and the float is thereby permitted to move further downwardly into the test chamber 23 and to a position closely adjacent the level of the hard test water and this condition of the test water is caused to actuate certain other indicators or signals as later described.

The float 44 is carried on an elongated lever-arm 46 which is rigidly secured to a transversely disposed shaft 47. The shaft 47 is adapted to have pivotal turning movements and is provided at each of its ends with a pillow block or support 48.

The members 44, 46 and 47 are preferably provided with a counter-weight 49 adjustably and slidably positioned on an arm 50, the latter being rigidly secured to the shaft 47. The counter-weight is provided with a set screw 51 for a locking engagement with the arm 50 for providing a desired degree of counter-balance, it being understood that the float 44 but slightly compresses soap suds during a downward movement of the float. The desired degree of adjustment of the counter-weight 49 is such that at times when the float is released at the proper time for a downward movement by a means later described, that said float moves downward slowly by gravity but is not of sufficient weight to crush or disintegrate the soap suds or bubbles in instances when the latter have formed in the mixing chamber.

As best shown in Figure 3, a second arm 52 similar to the arm 50 is affixed to the shaft 47 for turning the latter and maintaining the float 44 in a normal raised position with respect to the mixing chamber. The counter-weight 49 may be positioned on the arm 52, if desired. The arm 52 is normally maintained downwardly by means of a detent 53 mounted on a vertically disposed shaft 54 adapted to have sliding movements through a guide 55. The upper end of the shaft 55 is pivotally attached as at 56 to a collar 57. The collar is pivotally secured by a pin 58 to a lever 59. Said pivots and collar provide a universal joint for communicating motion from a lever 59 to the vertically disposed shaft 54 and the detent-lug 53 thereof. The lever 59 is maintained in a normal downward position for holding the float 44 in a normal upward position by means of an adjustable spring 60. At times when the spring 60 is extended the lever 59 is adapted to move upwardly and raise the detent-lug 53 for permitting the float 44 to move downwardly by gravity towards the mixing chamber 23.

Figure 4:
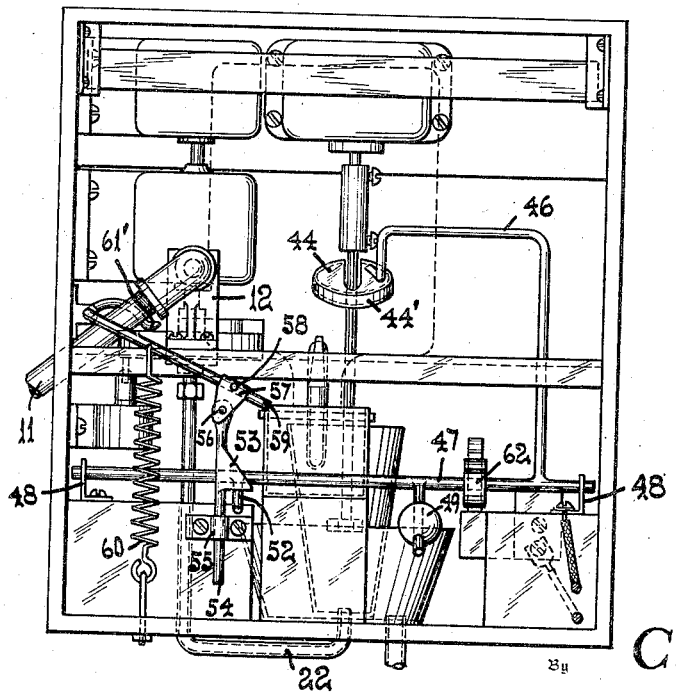
Figure 4 is an end elevation of the opposite end of the said embodiment shown in Figure 2.

The lever 59 is integral with a shaft portion, the latter being longitudinally disposed of the apparatus and adapted to have rotary movements in its bearing blocks 61. The said shaft of the lever 59, at its opposite end with respect to said lever, is provided with a portion 59' which, as best shown in Figures 3 and 4, extends within the plane of the disc 17 and is provided with an up-turned end 61' which rides upon and is in contact with the upper surface of the disc 17, said up-turned end 61' facilitates a sliding contact between said end and the heretofore mentioned lug-electrode 39. At times when said end 61' rides to the surface of the lug-electrode 39 and becomes elevated it thereby stretches the spring 60 and releases the detent 53, permitting the float 44 to move downwardly towards the mixing chamber 23.

As shown in Figure 3, said end 61' is so positioned with respect to the upper surface of the disc 17 that it is not raised upwardly by means of contact with the lug-electrode 39 until after the circuit through the electrodes 40 and 41 has become opened by means of the lug-electrode 39 passing out of contact with the electrode 41. In other words, before the float 44 is released for a downward movement the circuit through the motor 38 becomes opened and a communication of rotary movement to the agitator 36 is prevented.

A block of insulating material 62 is secured to the transversely disposed shaft 47, said block having an electrode 63 which swings correspondingly with respect to the lever 46 and the float 44. A spring electrode 64 bears against the block 62 and at times contacts with the electrode 63. The electrode 63 is at all times in communication with a flexible wire or electrical conductor 65 and the spring electrode 64 is in electrical communication at all times with a wire 66. The wires 65 and 66 are in communication, at times, with later described electrical circuits. The block of insulation 62 may be rigidly or adjustably mounted on the shaft 47 and is rotated by means of the vertical swinging movement of the lever 46, the latter in turn being adapted to move in a downward direction responsive to gravity provided by the slight weight of the counter balanced float 44 and is adapted to be raised upwardly slightly when in the mixing chamber, incident to the formation of soap bubbles therein and the expansion in bulk of the contents of the vessel. At times when the float 44 is prevented from making a complete downward stroke incident to soap bubbles within the mixing chamber a circuit is closed between the wires 65 and 66 through contact of the electrodes 63 and 64 incident to the then position of the float, said closed circuit being adapted to actuate certain later described indicators or enunciators. At times when the float 44 is permitted to move downwardly to an extreme lower position, resultant from an absence of soap bubbles in the mixing chamber 23 it will be understood that at this time while a circuit is closed through the electrodes 63 and 64 that the actuation of said indicators and enunciators is not immediately caused since a retard relay 67 is included in the circuit wire 65.

At times when the arm 46 is in a lowermost position as permitted by the absence of soap bubbles from the mixing chamber 23, said arm comes in contact with a rigidly positioned detent-electrode 68' having a wire 68 leading to a source of electrical energy, said wire becoming energized from said source through a wire 69, the latter being in electrical communication with the pillow block 48 and shaft 47. At times when an electrical circuit is closed incident to a contact between the arm 46 and the detent-electrode 68', a light bulb 70 and bell 71 become actuated, said members 70 and 71 being in electrical communication with the wire 69. If desired a transformer 72 may be employed.

The wires 68 and 69 are in electrical communication with the transformer 72. The wire 66 is in electrical communication with the wire 68 and the wire 65 is in electrical communication with the wire 69 through the retard relay 67. The time relay 67 is adapted to close a relay switch 73 for closing a circuit through a light bulb 74 and a buzzer 75 and it will be understood that the members 74 and 75 will only be actuated after the switch 73 has closed.

Buzzers, bells, or light bulbs may be employed for providing either visible or audible signals as may be desired and the light bulb 74 may be of a different color from the light bulb 70.

If desired, the time relay 67 may be omitted and the disc 17 arranged for opening and closing the circuit between the wires 65 and 66 at the proper time. The relay functions to prevent a false signal to be generated at times when the float 44 moves within the mixing chamber 23 during a testing period, the contacts 63 and 64 then closing a circuit during said period, the relay insures that neither the buzzer 75 or light 74 is immediately actuated nor until after the expiration of a slight interval of time or until a test has been made which may include an application of the float 44 to the interior of the mixing chamber. In other words, when the float 44 enters the mixing chamber if the latter contains soap bubbles, said bubbles might cause the float to stop and immediately actuate the members 74 and 75, were it not for the time relay, it being understood that mere contact between said bubbles and said float is not ordinarily sufficient for a satisfactory test.

A satisfactory test necessitates that said bubbles hold the float for an interval before the result of said test is enunciated or designated, said interval corresponding to the length of time which must expire before the relay switch 73 is closed and the indicators 74 and 75 actuated. Also in instances where the bubbles do not hold the float in contact position therewith for an interval sufficient to designate a complete test and in lieu of holding the float said bubbles break down allowing the float to lower further into the mixing chamber. The absence of soap bubbles becomes designated resultant from contact between the arm 46 and the electrode 67 through an actuation of the bell 71 whereby a hard condition of the water is designated.

At times when the bubbles break down only partially allowing the float to become lowered past its soft water indicating position and before the relay has permitted an actuation of the buzzer 75 through the electrodes 63 and 64 and in the event that the soap bubbles are not sufficiently broken down to allow the float to enter the vessel sufficiently to close the hard water switch, then in this case neither the hard nor soft water switches would be actuated and this condition would indicate to the operator that the test water has been provided with a characteristic by means of the water softener apparatus of Patent Number 1,195,923 which is on the border line of a satisfactory degree of softness.

Also the relay functions at times when the arm 46 closes the soft water switch although there are no soap bubbles within the vessel and in this case it closes the soft water switch while lowering the float further into the vessel and before the hard water switch is closed and if the relay did not delay the actuation of the indicators 74 and 75 during an extreme downward travel of the float, said indicators 74 and 75 would falsely indicate a satisfactory softness of the water being tested.

The means for actuating the several parts of said synchronized mechanism includes a boss 76 positioned on the lower surface of the revoluble disc 17 adjacent the perimeter of the latter, said boss making contact once during each complete revolution of the disc, with an arm-lever 77 which governs a three-way switch 78. The three-way switch 78 is positioned stationary by any suitable means and provided with three wires, the wire 79 thereof leads to the motor 21 which revolves the disc 17. The motor 21 is adapted to be energized at times when the wire 79 is placed in a closed circuit with either the wire 80 or 81 of the switch 78 and at times when a second three-way switch 82 permits the same.

At times when the boss 76 of the disc 17 pushes the arm-lever 77 of the switch 78, the latter opens the circuit for stopping the motor 21, said motor being started by means of the second three-way switch 82, the energy flowing through the wire 83 from the wire 44" and through the motor 21, the wire 84 being also in communication with the motor 21 through a wire 84'.

The heretofore mentioned wire 42 which conveys electrical energy to the second motor 38 is joined to the wire 84 as shown in Figure 1.

The wire 83 also leads to the transformer 72 and is in effect a continuation of the wire 69. The wire 68" is in effect a continuation of the wire 68 through the transformer 72 and is joined to the wire 84.

The wires 84 and 44" in addition to conveying energy to the various parts of the apparatus also convey electrical energy to a light bulb 85 at times when a line switch 86 is closed. The bulb 85 is utilized to indicate that electrical energy is being delivered to the wires 44" and 84 and said bulb 85 may be dispensed with if desired. When the line switch 86 is manually closed the three-way switch 82 is then also manually closed for the purpose of making one test and if it is desired to so arrange the apparatus that tests are automatically and intermittently made the same may be consummated by closing the line switch 86 and including the three-way switch 82 in a certain mechanism for cooperation in conjunction with said mechanism, the latter comprising a meter switch, not shown, but such as or similar to the meter switch shown in Patent No. 1,720,706 issued July 19, 1920 to Winton and referring particularly to said Winton construction and to his revoluble indicator used for designating how many thousands of gallons of water or fractions thereof have passed through his meter, said arm being indicated at 66 in the Winton drawings and revolving in a clockwise direction, a wire is placed in electrical communication with the axle of the Winton arm 66, said wire also being in communication with a source of electrical energy. A plurality of spaced apart electrical contacts are then provided upon the face of the dial of the Winton meter switch and in insulated relation with respect to the wire leading to the axis of the metallic arm indicator 66 of the Winton switch. Said spaced apart contacts each having an individual wire leading to a source of electrical energy, the arrangement of parts being such that as the Winton arm 66 rotates and comes into register with said contacts it thereby closes an electrical circuit for actuating the apparatus of the present invention, the arrangement being such that when the Winton meter switch is altered as above described, said Winton device not only performs its usual function of indicating water measurements but also functions as a substitute for the three-way switch 82 of the instant apparatus and in a manner whereby as the indicator arm 66 of the Winton meter switch revolves it will close circuits for actuating the apparatus of the present invention intermittently for making intermittent water tests as may be desired, such as, for instance, making one water test for each thousand gallons of water that runs through the Winton meter.

It will be understood that a time clock mechanism can be substituted for actuating the three-way switch 82 in lieu of the Winton water meter switch whereby the apparatus of the present invention in lieu of automatically making a water test for each thousand gallons automatically makes a water test for each preselected period of time.

Also it is obvious that in lieu of the employment of electrically energized motors for driving the several parts of the apparatus that a spring motor may be employed particularly in instances where audible signals only are desired.

What is claimed is:—

1. A water testing device comprising a cup provided with an outlet, a vessel mounted vertically in said cup having an open end disposed higher than the open end of said cup, a tube having an end disposed higher than said cup and within said vessel, the other end of said tube disposed within said cup for syphoning water from the vessel, an agitator having an end disposed within said vessel, a conduit in communication with said vessel adapted to be connected with a source of supply of test water, a normally closed cut-off valve for the conduit, a revoluble cam for opening said valve, a reservoir for liquid soap, a swingable dipper adapted to remove soap from the reservoir, said dipper having a spout adapted to swing towards said vessel for transferring soap from the reservoir to the vessel, a lug carried by said cam for swinging said spout, a pivotally mounted float arranged to swing into and out of alignment with said vessel, a signal device adapted to be actuated by said float, and driving means for said devices.

2. In an apparatus for testing the softness of water, the combination of a vessel having an open end, means for feeding test water into said vessel for washing said vessel, means for cutting off said feeding, means carried by the vessel for causing a predetermined quantity of said water to be trapped in said vessel, means synchronized to cause a preselected quantity of soap to enter said vessel subsequent to said trapping, an agitator extending into said vessel, driving means for the agitator synchronized to operate subsequent to the entrance of said soap into said vessel for admixing said soap and water, a signal mechanism, a substantially counterbalanced pivotally mounted float adapted to move into alignment with the open end of the vessel, said float adapted to contact said mixture and to have vertical swinging movements corresponding to the bulk of the mixture for actuating said signal responsively to said bulk.

3. An apparatus for testing water having, in combination means adapted to be connected to a source of supply of water to be tested, means for passing test water through the apparatus from said source, a vessel, means for detaining a sample of said water in said vessel for applying a test to said sample, means for supplying a preselected quantity of soap to said vessel for admixture with said sample of water, means including a shaft extending into said vessel for mixing said soap and sample of water together for causing soap bubbles to form on said sample of water, and a signal mechanism including a swingable float, said float adapted to be raised by said bubbles and to lower by the absence thereof for causing corresponding actuation of said signal mechanism for indicating the action of said soap with respect to said sample.

4. In an apparatus for testing the hardness of water, the combination of a vessel, mechanism for feeding test water into said vessel, mechanism for causing a measured quantity of said water to remain in said vessel, mechanism for admitting a predetermined quantity of soap into said vessel and said measured water, mixing mechanism extending into said vessel for mixing said quantities of water and soap together, signal mechanism, a float connected to said signal mechanism and movable into the vessel to contact with said quantities of water and soap subsequent to the admixture thereof for actuating said signal mechanism responsive to the physical character of said mixture, and driving means for said mechanisms.

5. The combination, in a machine for applying a soap test to water, of a vessel, mechanism for passing a preselected proportional amount of soap and water to said vessel, mechanism extending into said vessel for stirring the soap and water therein to expand the bulk thereof, a float arranged to move into and out of said vessel, means for holding the float out of the vessel during the operation of the stirring mechanism and for a predetermined period of time thereafter to admit settling of the admixture, and indicating means connected to the float and operable thereby when released and moved into the vessel.

CLAYTON W. WOODS.